US009672659B2

(12) United States Patent
Velkavrh et al.

(10) Patent No.: US 9,672,659 B2
(45) Date of Patent: Jun. 6, 2017

(54) GEOMETRICALLY AND SEMANITICALLY AWARE PROXY FOR CONTENT PLACEMENT

(75) Inventors: Urban Velkavrh, Berlin (DE); Mridul Aanjaneya, Standford, CA (US); Timo Pekka Pylvänäinen, Menlo Park, CA (US); Radek Grzeszczuk, Menlo Park, CA (US); Ramakrishna Vedantham, Sunnyvale, CA (US)

(73) Assignee: HERE Global B.V., Veldhoven (NL)

( * ) Notice: Subject to any disclaimer, the term of this patent is extended or adjusted under 35 U.S.C. 154(b) by 1144 days.

(21) Appl. No.: 13/337,930

(22) Filed: Dec. 27, 2011

(65) Prior Publication Data

US 2013/0162644 A1    Jun. 27, 2013

(51) Int. Cl.
| | | |
|---|---|---|
| G06T 17/20 | (2006.01) |
| G06T 17/05 | (2011.01) |
| G06T 19/00 | (2011.01) |
| G06T 15/20 | (2011.01) |

(52) U.S. Cl.
CPC .............. *G06T 17/05* (2013.01); *G06T 15/20* (2013.01); *G06T 19/006* (2013.01)

(58) Field of Classification Search
CPC ........ G06T 15/20; G06T 17/05; G06T 19/006
See application file for complete search history.

(56) References Cited

U.S. PATENT DOCUMENTS

| 6,529,206 | B1 * | 3/2003 | Ohki et al. ..................... 345/619 |
| 6,556,195 | B1 * | 4/2003 | Totsuka et al. ............... 345/419 |
| 6,912,293 | B1 * | 6/2005 | Korobkin ....................... 382/100 |
| 2002/0087403 | A1 * | 7/2002 | Meyers et al. .................. 705/14 |
| 2003/0151592 | A1 * | 8/2003 | Ritter ............................ 345/156 |
| 2004/0233171 | A1 * | 11/2004 | Bell et al. ...................... 345/168 |
| 2005/0001852 | A1 * | 1/2005 | Dengler et al. ............... 345/633 |
| 2005/0179685 | A1 * | 8/2005 | Kake et al. .................... 345/419 |
| 2005/0270537 | A1 * | 12/2005 | Mian et al. .................... 356/437 |
| 2006/0132482 | A1 * | 6/2006 | Oh ................................. 345/419 |
| 2007/0043616 | A1 * | 2/2007 | Kutaragi et al. ................ 705/14 |
| 2007/0242131 | A1 * | 10/2007 | Sanz-Pastor et al. ..... 348/14.02 |

(Continued)

OTHER PUBLICATIONS

Floraine Grabler, Maneesh Agrawala, Robert W. Sumner, and Mark Pauly, 2008, "Automatic generation of tourist maps", ACM Transactions on Graphics, vol. 27, Issue 3, Article 100 (Aug. 2008), 11 pages.*

(Continued)

*Primary Examiner* — Charles Tseng
(74) *Attorney, Agent, or Firm* — Ditthavong & Steiner, P.C.

(57) ABSTRACT

An approach is provided for providing perspective-based content placement. A content placement platform processes and/or facilitates a processing of one or more models of one or more objects associated with a geographical area to cause, at least in part, a decomposition of the one or more models into one or more simplified surfaces. The content placement platform further causes, at least in part, a selection of one or more portions of the one or more simplified surfaces as one or more content placement layers based, at least in part, on one or more viewpoints, with the one or more content placement layers supporting a perspective-based rendering of one or more content items associated with the one or more objects.

18 Claims, 10 Drawing Sheets

(56) References Cited

U.S. PATENT DOCUMENTS

| | | | |
|---|---|---|---|
| 2008/0162043 A1* | 7/2008 | Emoto et al. | 701/211 |
| 2008/0198158 A1 | 8/2008 | Iwamura et al. | |
| 2009/0091571 A1* | 4/2009 | Zalewski | 345/427 |
| 2009/0109216 A1 | 4/2009 | Uetabira | |
| 2009/0157503 A1* | 6/2009 | Farouki et al. | 705/14 |
| 2010/0066750 A1* | 3/2010 | Yu et al. | 345/581 |
| 2010/0085350 A1 | 4/2010 | Mishra et al. | |
| 2011/0279446 A1 | 11/2011 | Castro et al. | |
| 2012/0113138 A1 | 5/2012 | Uusitalo et al. | |

OTHER PUBLICATIONS

Höllerer, Tobias, and Steve Feiner, "Mobile augmented reality,"Telegeoinformatics: Location-Based Computing and Services, Taylor and Francis Books Ltd., London, UK 21 (2004).*

Ventura, Jonathan, and Tobias Höllerer, "Real-time Planar World Modeling for Augmented Reality," 2010.*

You, Yu, Petros Belimpasakis, and Petri Selonen, "A hybrid content delivery approach for a mixed reality web service platform," Ubiquitous Intelligence and Computing, Springer Berlin Heidelberg, 2010, pp. 563-576.*

Attene et al., "Hierarchical Convex Approximation of 3D Shapes for Fast Region Selection", 2008, pp. 1-10, vol. 27, Issue 5, Computer Graphics Forum.

Attene et al., "Hierarchical Mesh Segmentation Based on Fitting Primitives", 2006, 16 pages, vol. 22, Visual Computer.

Chauve et al., "Robust Piecewise-Planar 3D Reconstruction from Large-Scale Unstructured Point Data", 2010, 8 pages, IEEE.

Cohen-Steiner et al., "Variational Shape Approximation", 2004, pp. 905-914, ACM SIGGRAPH.

Dobkin et al., "An efficient algorithm for finding the CSG representation of a simple polygon", 1993, pp. 1-23.

Heath et al., Image Webs: Computing and Exploiting Connectivity in Image Collections, 2010, 8 pages, San Francisco, CA.

Hile et al., "Visual Navigation for Mobile Devices", 2010, vol. 17, Issue 2, pp. 16-25, MultiMedia, IEEE.

Korah et al., "Strip Histogram Grid for Efficient LIDAR Segmentation from Urban Environments", publication, Jun. 2011, pp. 74-81.

Lien, "Approximate Convex Decomposition and its Applications", Dec. 2006, pp. 1-144, Department of Computer Science and Engineering, Texas A&M University.

Mehra et al., "Abstraction of Man-Made Shapes", 2009, 10 pages, vol. 10, Siggraph, Asia.

Pylvanainen et al., "Automatic Alignment and Multi-View Segmentation of Street View Data using 3D Shape Priors", May 2010, pp. 1-8, Paris, France.

Snavely et al., "Photo Tourism: Exploring Photo Collections in 3D", 2006, 12 pages, vol. 25, Issue 3, SIGGRAPH.

Takacs et al., "Outdoors Augmented Reality on Mobile Phone using Loxel-Based Visual Feature Organization", 2008, 8 pages, ACM international conference on Multimedia Information Retrieval.

Takacs et al., "Unified Real-Time Tracking and Recognition with Rotation-Invariant Fast Features", 2010, pp. 934-941, In Proceedings of CVPR.

Notification of Transmittal of the International Search Report and the Written Opinion of the International Searching Authority, or the Declaration; International Search Report; Written Opinion for corresponding International Application No. PCT/2012/051233 dated Jun. 18, 2013, pp. 1-13.

Office Action for corresponding European Patent Application No. 12861275.1-1502, dated Feb. 1, 2016, 4 Pages.

* cited by examiner

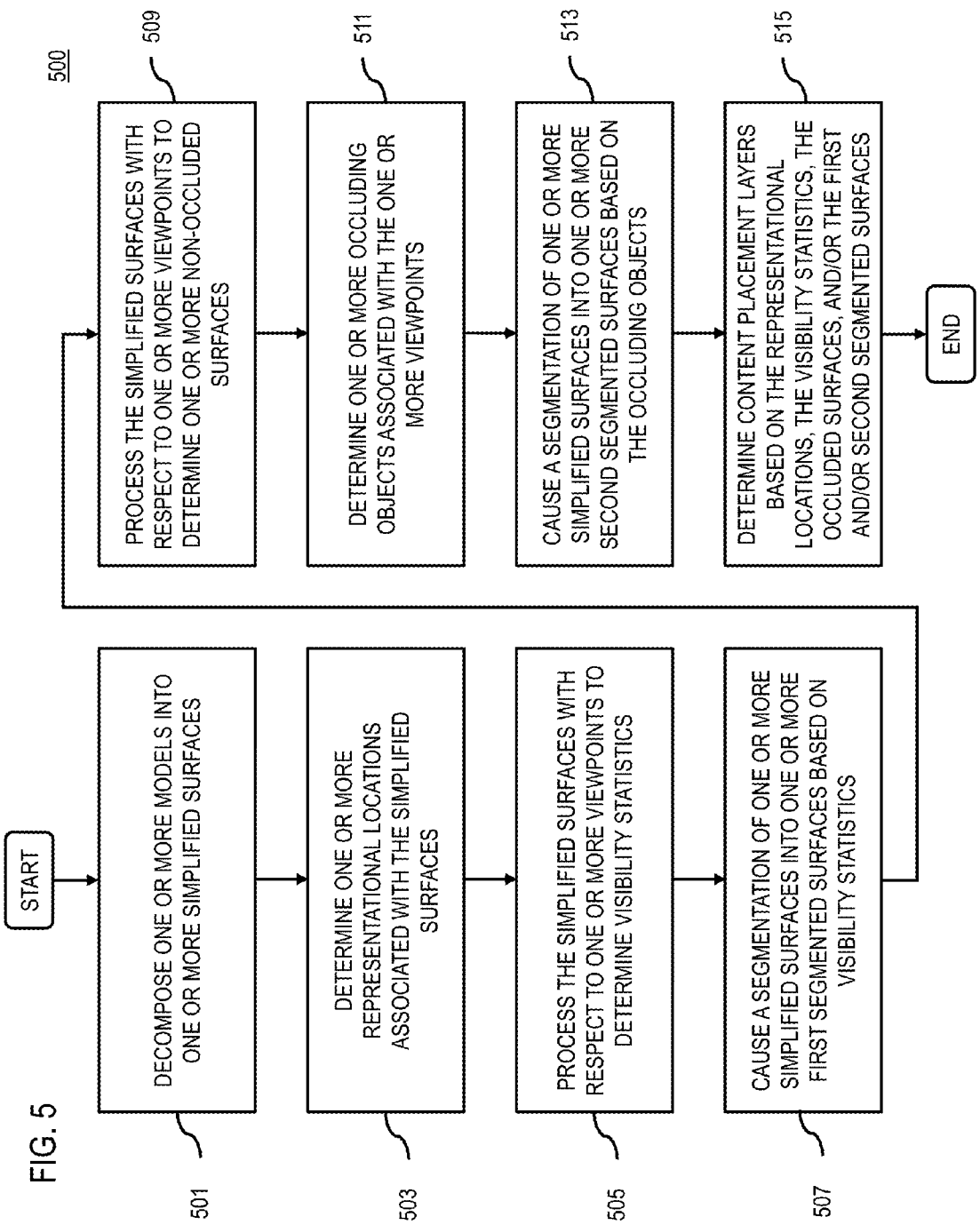

GEOMETRICALLY AND SEMANITICALLY AWARE PROXY FOR CONTENT PLACEMENT

BACKGROUND

Service providers and device manufacturers (e.g., wireless, cellular, etc.) are continually challenged to deliver value and convenience to consumers by, for example, providing compelling network services. Augmented reality is a new type of service that service providers are offering as device manufacturers develop more powerful devices. Augmented reality refers to a system that mixes the real world with digital content. In this context, the real world may refer to captured videos or images of a geographical area, such live view finder images of an area, or still images that were previously captured of an area. Digital content may refer to any type of information, such as names, phone numbers, reviews, menus, etc. Augmented reality combines the real world with the digital content by overlaying the digital content over the real world. However, current augmented reality systems ignore the three-dimensional structure of the real world. For example, current systems render augmentations that are effectively seen through real world objects by placing the augmentations based solely on latitude and longitude positions. Accordingly, such systems lead to an unintuitive augmented reality that provides sub-optimal experiences. Service providers and device manufacturers face significant technical challenges in providing augmented reality systems that preserve the three-dimensional structure of the real world and render augmentations that account for such three-dimensional structure.

SOME EXAMPLE EMBODIMENTS

Therefore, there is a need for an approach for providing perspective-based content placement in augmented reality.

According to one embodiment, a method comprises processing and/or facilitating a processing of one or more models of one or more objects associated with a geographical area to cause, at least in part, a decomposition of the one or more models into one or more simplified surfaces. The method also comprises causing, at least in part, a selection of one or more portions of the one or more simplified surfaces as one or more content placement layers based, at least in part, on one or more viewpoints, with the one or more content placement layers supporting a perspective-based rendering of one or more content items associated with the one or more objects.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more models of one or more objects associated with a geographical area to cause, at least in part, a decomposition of the one or more models into one or more simplified surfaces. The apparatus is also caused to select one or more portions of the one or more simplified surfaces as one or more content placement layers based, at least in part, on one or more viewpoints, with the one or more content placement layers supporting a perspective-based rendering of one or more content items associated with the one or more objects.

According to another embodiment, a computer-readable storage medium carries one or more sequences of one or more instructions which, when executed by one or more processors, cause, at least in part, an apparatus to process and/or facilitate a processing of one or more models of one or more objects associated with a geographical area to cause, at least in part, a decomposition of the one or more models into one or more simplified surfaces. The apparatus is also caused to select one or more portions of the one or more simplified surfaces as one or more content placement layers based, at least in part, on one or more viewpoints, with the one or more content placement layers supporting a perspective-based rendering of one or more content items associated with the one or more objects.

According to another embodiment, an apparatus comprises means for processing and/or facilitating a processing of one or more models of one or more objects associated with a geographical area to cause, at least in part, a decomposition of the one or more models into one or more simplified surfaces. The apparatus also comprises means for causing, at least in part, a selection of one or more portions of the one or more simplified surfaces as one or more content placement layers based, at least in part, on one or more viewpoints, with the one or more content placement layers supporting a perspective-based rendering of one or more content items associated with the one or more objects.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 5 is a detailed flowchart of a process for providing perspective-based content placement, according to one embodiment;

DESCRIPTION OF SOME EMBODIMENTS

Examples of a method, apparatus, and computer program for providing perspective-based content placement are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
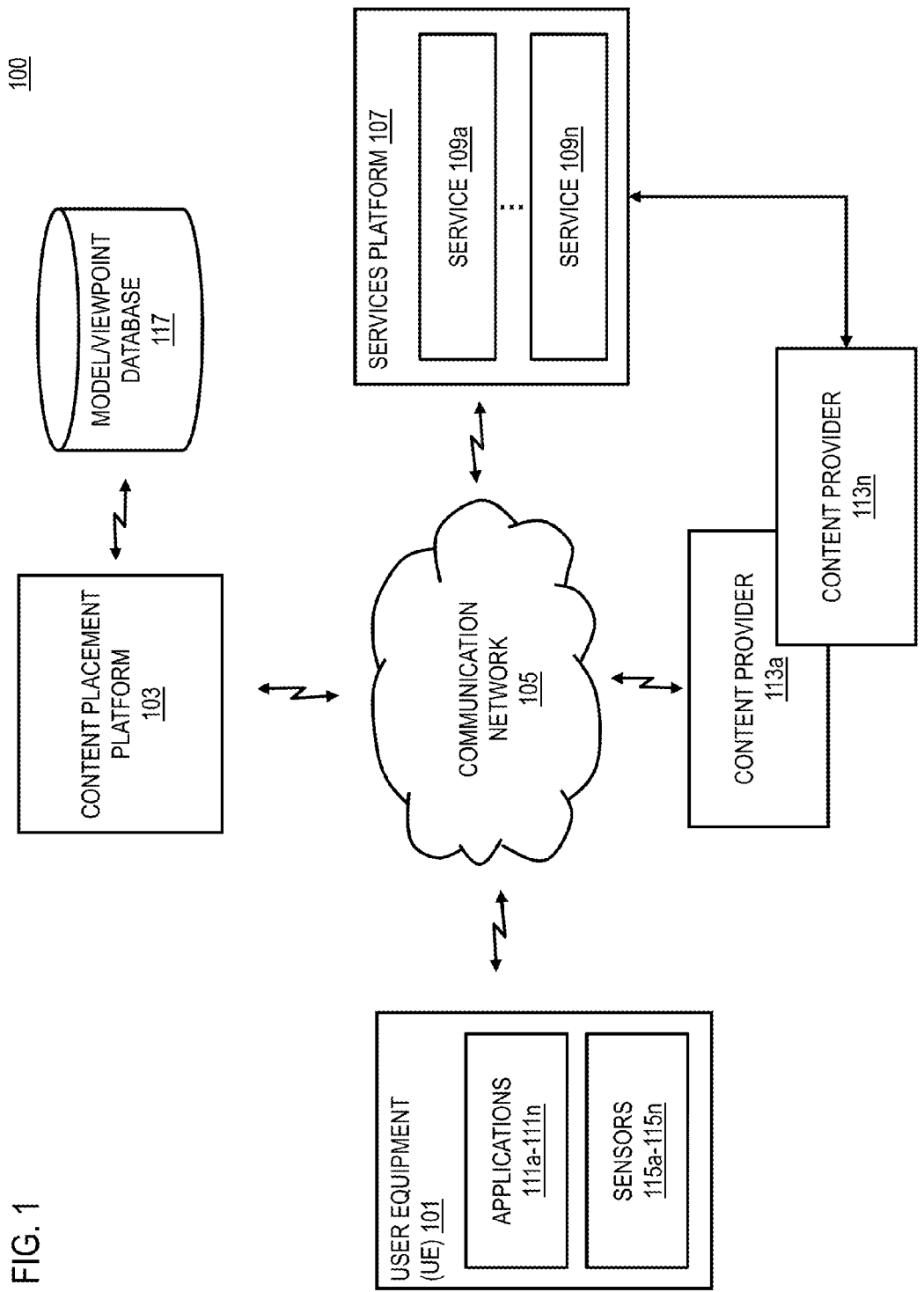
FIG. 1 is a diagram of a system capable of providing perspective-based content placement, according to one embodiment.

FIG. 1 is a diagram of a system capable of providing perspective-based content placement, according to one embodiment. As discussed above, augmented reality is a new type of service that service providers are offering that provides overlaid digital content over the real world to provide, for example, information associated with the geographical area. However, current augmented reality systems ignore the three-dimensional structure of the real world and render augmentations that are effectively seen through real world objects and do not preserve the three-dimensional structure of the real world. Such systems, therefore, are unintuitive and provide suboptimal experiences.

The inability of current augmented reality systems to account for the three-dimensional structure of the real world is based on several issues. One issue is that the real world structure must be analyzed to account for the three dimensions. In practice, such analysis cannot be done in real time and insufficient information is provided for the analysis. A pre-computed model of the world is generated from data collected at a different time. Another issue is aligning the current user view with the pre-computed model. Yet another issue is that determining the optimal placement of content for a given view is computationally intensive, especially with respect to mobile devices.

To address this problem, a system 100 of FIG. 1 introduces the capability to generate pre-computed content placement layers that enable optimal content item placement that maintains the perspective of the real world. The system 100 allows for the processing of one or more models associated with the real world to decompose the models into one or more simplified surfaces. The simplified surfaces are then analyzed with respect to one or more viewpoints to select one or more portions of the simplified surfaces as one or more content placement layers. Accordingly, the content placement layers support a perspective-based rendering of one or more content items associated with one or more objects of the real world.

In one embodiment, the system 100 allows for the pre-processing of the one or more models independently from a device that is providing the augmented reality to a user to generate the content placement layers. The generated content placement layers may then be transmitted to the device providing the augmented reality as, for example, content placement layers metadata. The device may then combine the content placement layers with content items to provide the perspective-based rendering of the augmented reality to provide additional information with respect to the geographical area surrounding the device. In one embodiment, the one or more models may be loaded on the device, and the device itself may perform the processing to determine the content placement layers prior to, or at the time of, providing the augmented reality.

As shown in FIG. 1, the system 100 comprises user equipment (UE) 101 having connectivity to a content placement platform 103 via a communication network 105. The UE 101 may include or be associated with one or more applications 111a-111n (collectively referred to as applications 111). The applications 111 may include any application that may be executed by the UE 101, such as one or more navigation applications, map applications, browser applications, calendar applications, contacts applications, etc. In one embodiment, the functions of the content placement platform 103 may be embodied in one or more applications 111 executed at the UE 101. The UE 101 may also include or be associated with one or more sensors 115a-115n (collectively referred to as sensors 115). The sensors 115 may include any type of sensor that is compatible with the UE 101, such as a light sensor, a pressure sensor (e.g., barometer), a motion sensor (e.g., accelerometer), a location sensor (e.g., GPS), a direction sensor, an image sensor (e.g., camera), a sound sensor (e.g., microphone), etc. By way of example, the UE 101 may include a camera that allows the UE 101 to capture images (e.g., photographs, video), which may be stored at the UE 101 and/or displayed live on a screen associated with the UE 101. A location sensor in addition to a direction sensor may allow the UE 101 to determine the location of the UE 101 and a direction that the UE 101 faces. For example, the location sensor can determine the latitude and longitude of the UE 101 and the direction sensor can determine the direction that a camera associated with the UE 101 is facing. Accordingly, the UE 101 can display an augmented reality on a display associated with the UE 101 based on the known location and direction of the UE 101 in addition to live images or videos acquired by the camera of the UE 101 of the current geographical area the UE 101.

The system 100 also includes a services platform 107 that provides one or more services 109a-109n (collectively referred to services 109) to components of the system 100. The services 109 may include a wide variety of services, such as content provisioning services that provision one or more models, one or more representations of the real world for augmentation, one or more viewpoints, etc. The services 109 may also include navigation services, mapping services, social networking services, location provisioning services, etc. The system 100 also includes content providers 113a-113n (collectively referred to as content providers 113). The content providers 113 may provide content to the components of the system, such as one or more content items used in providing the augmented reality, one or more models of one or more objects associated with a geographical area, one or more representations of the real world for augmentation, such as one or three-dimensional panoramas, etc.

In one embodiment, the content placement platform 103 may be associated with a model/viewpoint database 117. The model/viewpoint database 117 may include one or more three-dimensional models used for determining the content placement layers, one or more representations of the real world used for augmentations (e.g., panoramas), and information associated with viewpoints. In one embodiment, the information stored in the model/viewpoint database 117 may be provided rather by one or more services 109 and/or one or more content providers 113.

The UE 101 is any type of mobile terminal, fixed terminal, or portable terminal including a mobile handset, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The content placement platform 103 allows for the provisioning of content items within augmented reality by overlaying the content items over the real world. The content placement platform 103 processes one or more three-dimensional models of one or more objects associated with a geographical area to generate a content placement layer that enables placement of the content items within the augmented reality while maintaining the three-dimensional perspective of the real world. Thus, the content placement platform 103 allows for an intuitive augmented reality that provides users with the ability to gain an augmented understanding of the geographical surroundings with a uniform perspective of the real world and the content items.

The content placement platform 103 processes the one or more models to cause a decomposition of the one or more models into one or more simplified surfaces. The content placement platform 103 may use planes to fit the primitives of the one or more models. Where a model may include fine three-dimensional detail associated with the surfaces, the content placement platform 103 decomposes the detail into simplified surfaces. By way of example, the front façade of a building represented by a model may include circular columns. Decomposing the three-dimensional model of the building may decompose multiple circular columns into a single rectangular plane. However, the amount of decomposition may vary to preserve some degree of the detail presented by the model.

Upon generating the simplified surfaces, the content placement platform 103 causes a selection of one or more portions of the simplified surfaces as one or more content placement layers based, at least in part, on one or more viewpoints. The viewpoints correspond to one or more locations associated with the geographical area that a user may be located while using the augmented reality. Where the augmented reality is associated with a live view finder image (e.g., the camera of the UE 101 is rendering a live image of the surrounding geographical area on a display associated with the UE 101), the number of viewpoints may be large and may be based on the current location of the UE 101 as the UE 101 moves through the geographical area. Where the augmented reality is associated with one or more previously captured images, the number of viewpoints may be small and controlled based on, for example, the locations at which the images where captured. The selection of the portions of the one or more simplified surfaces for the one or content placement layers may be based on the visibility of the portions from the various viewpoints. Portions of the simplified surfaces that are visible from one or more viewpoints, or a threshold of viewpoints, may be selected as one or more content placement layers. Portions of the simplified surfaces that are not visible from one or more viewpoints, or a threshold of viewpoints, may not selected as content placements layers. The resulting one or more content placement layers support a perspective-based rendering of one or more content items associated with one or more objects. The content items are associated with the content placement layers to correspond to the object and preserve the perspective of the model of the object as the user views the augmented reality.

In one embodiment, the determination of the simplified surfaces may be based, at least in part, on mesh segmentation, where the mesh segmentation is based, at least in part, on one or more surface primitives. The surface primitives may be any type of surface primitive. In one embodiment, the surface primitive may include one or more planes. The planes may be defined by one or more shapes, such as triangles, squares, hexagons, etc. The content placement layers may be determined based on a clustering of the one or more surface primitives. By way of example, one or more surface primitives that define a single plane may be clustered together such that the resulting plane defines a content placement layer.

In one embodiment, the content placement layers may be determined based on a clustering of one or more simplified surfaces, or a combination of simplified surfaces and surface primitives. By way of example, three simplified surfaces that correspond to the front and two sides of a model of an object may be combined to form a single content placement layer, such that when a content item is associated with the content placement layer, the content item may appear to wrap around the model to cover the front and two sides of the model.

In one embodiment, the content placement platform 103 may determine one or more representational locations associated with the simplified surfaces. The representational locations may have inherent meaning tied to the location according to the position of the location with respect to the model or object. Thus, the representational location may distinguish content items for other content items within the same simplified surface. By way of example, an object represented by a model may be a building that includes a store front on the bottom floor and apartment units on the higher floors. Accordingly, the location associated with the bottom floor with respect to the simplified surface has a different representation than the locations associated with the higher floors. Specifically, a content item that is associated with the store within the bottom floor may be associated with the representational location associated with the bottom floor, rather than the representational locations associated with the higher floors. Thus, one or more content placement layers may be determined based, at least in part, on the one or more representational locations.

An additional representational location may be based on, for example, the specific side of the object that the simplified surface represents. For example, significance is generally placed on the front of objects. Accordingly, the content placement platform 103 may place a higher representational significance on a simplified surface that represents the front of an object, as compared to simplified surfaces that represent the sides and/or rear of the object.

In one embodiment, the content placement platform 103 processes simplified surfaces with respect to the viewpoints to determine visibility statistics with respect to the simplified surfaces. The visibility statistics rank the visibility of the simplified surfaces based on the various viewpoints. Simplified surfaces that have no or low visibility at certain viewpoints receive low visibility statistics, and simplified surfaces that have high visibility at certain viewpoints receive high visibility. Factors that affect the visibility scores of the simplified surfaces may include, for example, horizontal and vertical distances between the simplified surfaces and the viewpoints, and the sizes of the simplified surfaces. By way of example, a simplified surface that is horizontally close to a viewpoint that also is vertically far from the viewpoint may receive a poor or low visibility statistic because a user at the viewpoint will have a difficult time viewing the surface without having to look straight up. Conversely, a simplified surface that is horizontally far, but vertically close and large in size, may receive a good or high visibility statistic because a user at the viewpoint will have a good view of the surface. Based on the visibility statistics of the simplified surfaces, the content placement platform 103 determines the content placement layers.

In one embodiment, the content placement platform 103 processes simplified surfaces with respect to the viewpoints to determine one or more occluded or non-occluded surfaces with respect to the simplified surfaces. Based on the three-dimensional model, some of the simplified surfaces will become occluded by other simplified surfaces at various viewpoints. Associating a simplified surface that is occluded by another simplified surface with a content placement layer will cause whatever content item that is associated with the content placement layer to be incorrectly associated with the occluding simplified surface, rather than the occluded simplified surface. Further, although one simplified surface may be non-occluded associated with one viewpoint, the surface may become occluded when associated with a different viewpoint. Confusion may result if the surface is determined a content placement layer with respect to one viewpoint but not with respect to another viewpoint because a content item associated with the surface in one viewpoint will disappear if the user moves to the other viewpoint. Thus, the content placement platform 103 determines content placement layers with respect to the simplified surfaces based on a determination of non-occluded surfaces. In one embodiment, the content placement platform 103 attempts to determine at least one non-occluded surface for each model with respect to a set threshold of viewpoints.

Although a simplified surface may have low visibility statistics or may be occluded, a segment of the surface may have a high visibility statistic and may not be occluded. Accordingly, in one embodiment, the content placement platform 103 causes a segmentation of one or more of the simplified surfaces into one or more segmented surfaces based, at least in part, on the visibility statistics, a determination of occluding objects, or a combination thereof. The content placement platform 103 can then determine content placement layers based on the segmented surfaces such that simplified surfaces that otherwise would not be selected as content placement layers include segments that are selected as content placement layers.

The communication network 105 of system 100 includes, by way of example, one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof.

By way of example, the UE 101, the content placement platform 103, the services platform 107, and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
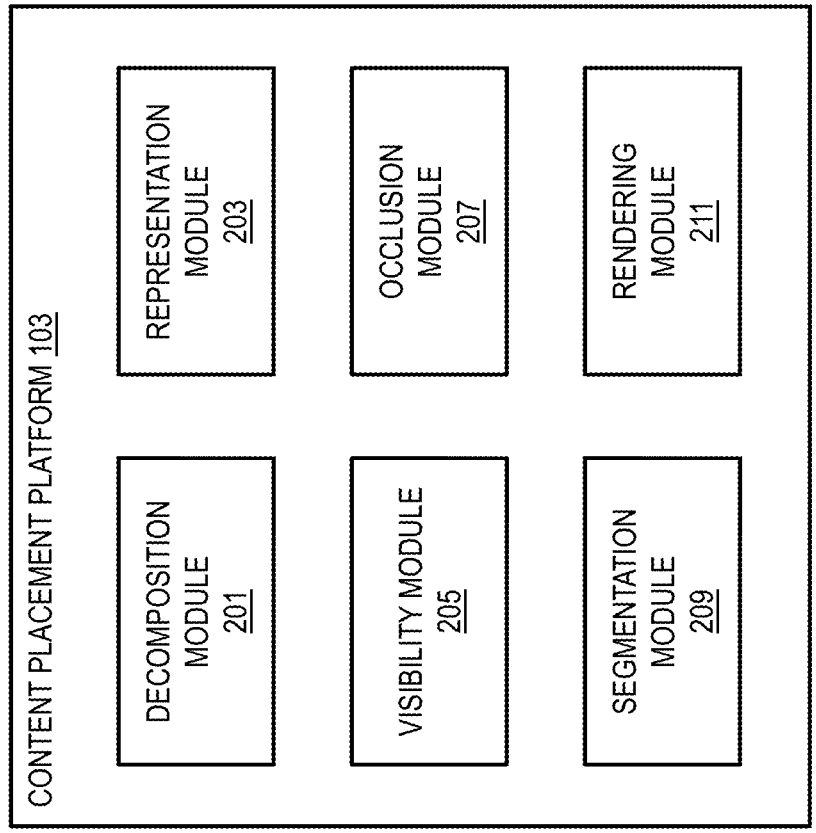
FIG. 2 is a diagram of the components of a content placement platform, according to one embodiment.

FIG. 2 is a diagram of the components of the content placement platform 103, according to one embodiment. By way of example, the content placement platform 103 includes one or more components for providing perspective-based content placement. It is contemplated that the functions of these components may be combined in one or more components or performed by other components of equivalent functionality. For example, the functions of these components may be performed by one or more applications 111 executed at the UE 101. In this embodiment, the content placement platform 103 includes a decomposition module 201, a representation module 203, a visibility module 205, an occlusion module 207, a segmentation module 209, and a rendering module 211.

The decomposition module 201 processes three-dimensional models of objects associated with a geographical area to cause, at least in part, a decomposition of the models into simplified surfaces. The decomposition module 201 uses one or more mesh segmentation algorithms to perform the decomposition. In one embodiment, the decomposition module 201 uses only planes in fitting surface primitives used in the three-dimensional modeling. In one embodiment, the decomposition module 201 first decomposes a three-dimensional model into nearly regular surfaces. The decomposition module 201 constructs a hierarchical segmentation of the three-dimensional model. The decomposition module 201 further analyzes one or more error metrics as the decomposition module 201 constructs the hierarchical segmentation. The decomposition module 201 analyzes the error as clusters are merged during the hierarchy generation. In one embodiment, the decomposition module 201 clips the hierarchy at a threshold number of clusters to prevent the error from growing. By way of example, the threshold number of clusters may correspond to 250 clusters. According to some viewpoints, the tops of the models representing objects may not be visible, such as when the models represent tall buildings and the viewpoint is at the base of the building. In such cases, the roof of the mesh segmentation may be disregarded and the focus of the mesh segmentation may be on the walls defining the buildings. In one embodiment, the decomposition module 201 analyzes the dominant direction of the models and seeds the segmentation starting at planes in these directions. The decomposition module 201 may also give preference to final orientations in these directions.

In one embodiment, the content placement platform 103 includes a representation module 203. The representation module 203 determines one or more representational locations of the simplified surfaces based on, for example, the one or more models, the one or more objects represented by the one or more models, or the combination thereof. The representational locations constitute semantically meaningful locations of the simplified surface. By way of example, the separate floors of an office building may include separate tenants, such that representational locations within the simplified surfaces constitute different content placement layers that correspond to the different tenants. Further, certain objects may already be designed for content placement, such as signs on buildings. The representation module 203 may determine within the simplified surfaces the representational locations that correspond to the objects (e.g., signs of the buildings) and designate the representational locations as content placement layers.

In one embodiment, the representation module 203 may also determine a hierarchy of the simplified surfaces that correspond to a hierarchy of content placement layers, or that designates which of the simplified layers should correspond to content placement layers. By way of example, typically the fronts of objects are provided more meaning than the sides of objects. Accordingly, labels corresponding to the objects are provided more weight when the labels visually correspond to the fronts of objects. The representation module may determine the simplified surfaces corresponding to the front, sides, and back, and designate the simplified surfaces corresponding to the fronts of the models content placement layers based on the inherent significance of the location with respect to the model.

The visibility module 205 determines the visibility statistics associated with the simplified surfaces. The visibility module 205 determines the one or more viewpoints associated with the simplified surfaces. For the viewpoints associated with the simplified surfaces, the visibility module 205 determines the visibility statistics. A majority of the building geometry associated with a building is not suitably visible from the street level. Thus, simplified surfaces associated with models of buildings not suitably visible from the street level are given low visibility statistics. For simplified surfaces that are seen, but only portions of the simplified surfaces are seen, the simplified surfaces may be given low visibility statistics. Further, simplified surfaces that are small relative to other simplified surfaces, or a threshold simplified surface, are provided low visibility statistics. In one embodiment, where viewpoints are limited to pre-collected panorama locations, simplified surfaces may be divided into a regular grid. For each grid cell, the visibility module 205 determines the viewpoints associated with the pre-collected panorama locations that have an un-occluded view of the grid cell to determine the visibility statistics associated with the simplified surfaces within the grid cell.

In one embodiment, the occlusion module 207 determines the simplified surfaces that are non-occluded surfaces. Because changing the position of the augmentations can be distracting to a user based on adjusting for when a content placement layer becomes occluded, the occlusion module 207 determines the likelihood the simplified surface is to become occluded as the user moves between viewpoints. Thus, the occlusion module 207 can perform processing to determine non-occluded surfaces, as well as occluding surfaces. The simplified surfaces that correspond to non-occluded surfaces may be selected as content placement layers, and the simplified surfaces that correspond to occluded surfaces may be discarded. In one embodiment, the occlusion module 207 uses a threshold to determine whether to select a simplified surface as a content placement layer based on the number of viewpoints the simplified surface is occluded. In one embodiment, the occlusion module 207 may determine the threshold such that there is at least one content placement layer visible for each provided model and/or object represented by a model.

As discussed above, a simplified surface, as a whole, may not be selected as a content placement layer based on, for example, the visibility statistics and/or one or more occluding objects. However, segments of the simplified surface may qualify as content placement layers. Thus, in one embodiment, the content placement platform 103 includes a segmentation module 209 that determines simplified surfaces that may not otherwise qualify as content placement layers and segments the surfaces into one or more segmented surfaces that do qualify as content placement layers. For example, a large simplified surface may be too high vertically with respect to a viewpoint to qualify as a content placement layer. However, the bottom segment of the simplified surface may qualify as a content placement layer. Accordingly, the segmentation module 209 segments the bottom segment of the simplified surface from the remainder of the simplified surface and selects the bottom segment as a content placement layer. The segmentation module 209 may perform substantially the same process for simplified surfaces that are occluded to generate segmented surfaces that are un-occluded and that are selected as content placement layers.

In one embodiment, the rendering module 211 interfaces with the various modules of the content placement platform 103 to collect the content placement layers associated with an augmented view of the real world. The rendering module 211 further interfaces with devices (e.g., UE 101) associated with the renderings of the augmented views of the real world to provide the information (e.g., metadata) associated with the content placement layers. The devices may then use the content placement layers to provide a perspective-based rendering of content items within the augmented reality. By way of example, in one embodiment, a UE 101 acquires a live view finder image of a geographical area and may provide information to the content placement platform 103 regarding the location of the UE 101, and may also provide the direction the camera of the UE 101 is currently facing. The content placement platform 103 by way of, for example, the rendering module 211 may then provide the UE 101 with the information (e.g., metadata) associated with the content placement layers. The UE 101 may then apply the content placement layers to the live view finder image in combination with content items to provide information associated with the geographical area displayed in the live view finder image while maintaining the three-dimensional perspective of the augmented reality relative to the content items. In one embodiment where the content placement platform 103 is embodied in one or more applications 111 running on the UE 101, the one or more applications performing the functions of the content placement platform 103 may simply interface with one or more applications 111 associated with the live view finder image of the surrounding geographical area to provide the content placement layers, as discussed above. In such an example, the UE 101 may perform the processing of the one or more models to determine the content placement layers.

In one embodiment, the rendering module 211 may provide a complete rendering of the augmented real world with content items associated with the content placement layers to devices. In such a scenario, the devices interacting with the content placement platform 103 perform little to no processing associated with determining the content placement layers. Rather, the devices may merely display the information provided from the content placement platform 103 that has performed pre-processing to generate a rendered augmented reality complete with content items within content placement layers. By way of example, an application 111 on the UE 101 accesses a service 109a that provides views associated with a geographical area that are augmented by the content placement platform 103 with content items and rendered by the rendering module 211, complete with, for example, a previously captured three-dimensional panorama of an area overlaid with content placement layers filled with content items. The service 109a may provide the complete augmented reality to the UE 101 in the form of a three-dimensional panorama. The three-dimensional panorama may then be displayed on the display of the UE 101 and may be modified according to the current direction of the UE 101. For example, as the user of the UE 101 uses the application 111 to pan around the panorama (e.g., for example by physically moving the UE 101 with respect to the surroundings), as the augmented reality pans according to the movements the information associated with the content placement layers modifies the content items to preserve the perspective of the augmented real world.

Figure 3:
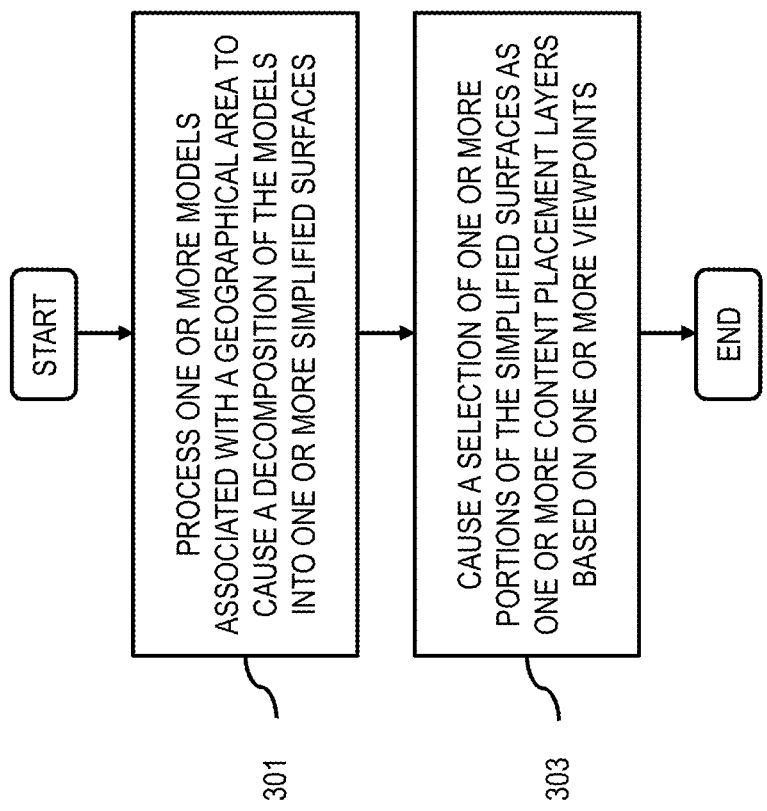
FIG. 3 is a flowchart of a process for providing perspective-based content placement, according to one embodiment.
Figure 9:
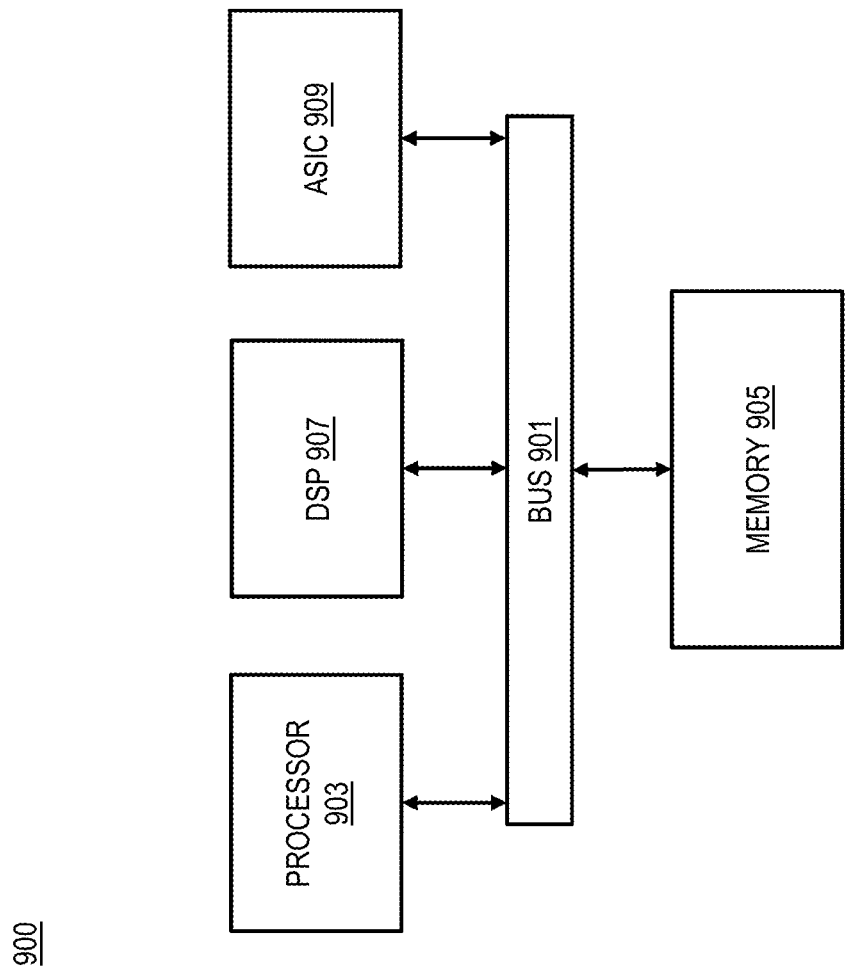
FIG. 9 is a diagram of a chip set that can be used to implement an embodiment of the invention.

FIG. 3 is a flowchart of a process for providing perspective-based content placement, according to one embodiment. In one embodiment, the content placement platform 103 performs the process 300 and is implemented in, for instance, a chip set including a processor and a memory as shown in FIG. 9. In step 301, the content placement platform 103 processes one or more models of one or more objects associated with a geographical area to cause, at least in part, a decomposition of the one or more models into one or more simplified surfaces. The one or more models are three-dimensional models of the one or more objects. The objects may correspond to any object that may be found in a geographical area, such as buildings, signs, streets, terraces, parks, natural objects (e.g., cliffs, rivers, lakes, waterfalls, hills, mountains, etc.). In one embodiment, the models are decomposed into nearly planar, regular surfaces. However, in one embodiment, the models may be decomposed into other simplified surfaces that may, for example, maintain to some degree three-dimensional features of the models. By way of example, the simplified surface may follow the pattern of a façade on the exterior of the building, such as columns. The decomposition occurs as discussed above with respect to the decomposition module 201.

In step 303, the content placement platform 103 causes, at least in part, a selection of one or more portions of the one or more simplified surfaces as one or more content placement layers based, at least in part, on one or more viewpoints. In one embodiment, where the augmented reality is based on previously created/captured images, the one or more viewpoints may constitute designated viewpoints of the geographical area. The viewpoints may constitute the locations from where the previously captured images where created. In one embodiment, the previously captured images may include one or more panoramas. In one embodiment, the previously created images may include a three-dimensional model of the geographical area represented in two-dimensions, and the viewpoints may be designated viewpoints with the three-dimensional model or may be any point within the three-dimensional model. In one embodiment, where the augmented reality is based on a live image view finder, the one or more viewpoints may constitute any point within the three-dimensional model.

The content placement platform 103 selects the content placement layers based on the simplified surfaces according to processing with respect to the viewpoints to support a perspective-based rendering of one or more content items associated with the one or more objects. Accordingly, content items may be rendered in an augmented rendering of the real world in a perspective-based framework that considers the three-dimensional structure of the real world that results in an intuitive based system. By way of example, the content placement layers cause associated content items to appear as if they are part of the augmented reality by preserving the perspective of the reality.

Figure 4:
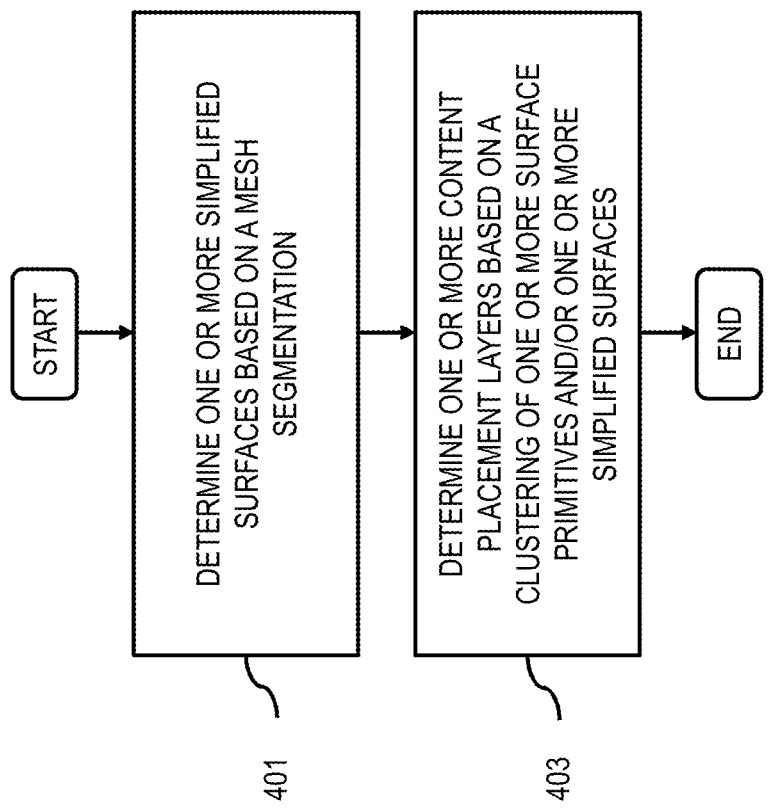
FIG. 4 is a flowchart of a process for decomposing one or more models of one or more objects associated with a geographical area, according to one embodiment.

FIG. 4 is a flowchart of a process for providing perspective-based content placement, according to one embodiment. In one embodiment, the content placement platform 103 performs the process 400 and is implemented in, for instance, a chip set including a processor and a memory as shown in FIG. 9. In step 401, the content placement platform 103 determines the one or more simplified surfaces based, at least in part, on mesh segmentation. The content placement platform 103 uses one or more mesh segmentation algorithms to perform the decomposition to generate nearly regular simplified surfaces. However, in one embodiment, the simplified surfaces do not need to be regular surfaces, such as when the simplified surfaces maintain some level of definition of the original surface in the three-dimensional model. The mesh segmentation may based, at least in part, on one or more surface primitives. The surface primitives may correspond to one or more planes defined by various shapes including, for example, triangles, squares, rectangles, hexagons, etc.

Further, the content placement platform 103 constructs a hierarchical segmentation of the three-dimensional model. The content placement platform 103 further analyzes one or more error metrics as the content placement platform 103 constructs the hierarchical segmentation. The content placement platform 103 analyzes the error as clusters are merged during the hierarchy generation. In one embodiment, the content placement platform 103 clips the hierarchy at a threshold number of clusters to prevent the error from growing. By way of example, the threshold number of clusters may correspond to 250 clusters. According to some viewpoints, the tops of the models representing the objects may not be visible, such as when the models represent tall buildings and the viewpoint is at the base of the building. In such cases, the roof of the mesh segmentation may be disregarded and the focus of the mesh segmentation may be on the walls defining the buildings. In one embodiment, the content placement platform 103 analyzes the dominant direction of the models and seeds the segmentation starting at planes in these directions. The content placement platform 103 may also give preference to final orientations in these directions.

In step 403, the content placement platform 103 determines one or more content placement layers based, at least in part, on a clustering of the one or more surface primitives, the one or more simplified surfaces, or a combination thereof. The content placement platform 103 may determine a cluster of surface primitives that may be combined to generate one simplified surface. For example, the cluster of surface primitives that form the front of a building may be clustered and abstracted to form a planar simplified surface that corresponds to the front of the building. The generated simplified surface may then be selected as a content placement layer. In one embodiment, the content placement platform 103 combines three simplified surfaces that correspond to the front and two sides of a model of an object to form a single content placement layer, such that when a content item is associated with the content placement layer, the content item may warp around the model to cover the front and two sides of the model.

FIG. 5 is a flowchart of a detailed process for providing perspective-based content placement, according to one embodiment. In one embodiment, the content placement platform 103 performs the process 500 and is implemented in, for instance, a chip set including a processor and a memory as shown in FIG. 9. However, as discussed above, the process 500 may also be implemented by one or more applications 111 executed at a UE 101. In step 501, the content placement platform 103 decomposes one or models into one or more simplified surfaces, as discussed above. Then, in step 503, the content placement platform 103 may process the one or more models, the one or more objects represented by the one or more models, or a combination thereof to determine one or more representational locations associated with the one or more simplified surfaces. As discussed above, one or more locations of a simplified surface may have one or more meanings. For example, the front of a building may have a different, more significant, meaning than the sides or rear of the building. Further, various sections of an object, such as a building, may have various different meanings. For example, the first floor may be associated with a store front, while the remaining floors may be associated with apartment units. Thus, the portion of the simplified surface that corresponds to the location of the store front may have a different meaning than the portion of the simplified surface that corresponds to the locations of the apartment units. Accordingly, the content placement platform 103 may determine one or more representational locations associated with the simplified surfaces to generate one or more content placement layers that will inherently include the meaning of the representational locations.

In step 505, the content placement platform 103 processes one or more simplified surfaces with respect to one or more viewpoints to determine visibility statistics with respect to the one or more simplified surfaces. As discussed above, depending on the orientation and/or perspective of the simplified surfaces with respect to the viewpoints, the simplified surfaces may have different visibility statistics based on the ability of a viewer at one of the viewpoints to see the simplified surfaces. Where viewpoints are limited based on the representation of the augmented real world being based on, for example, pre-collected panoramas collected at panorama locations, simplified surfaces are divided into a regular grid, and for each grid cell, statistics are generated for the simplified surfaces based on what viewpoints have an un-occluded view of the panorama. Where viewpoints are nearly unlimited based on the representation of the augmented real world being based on, for example, a live view finder image, the determination of the visibility statistics may be performed live based on, for example, line of sight determinations with respect to the various simplified surfaces.

In step 507, the content placement platform 103 causes, at least in part, a segmentation of one or more of the one or more simplified surfaces into one or more segmented surfaces based, at least in part, on the visibility statistics. The content placement platform 103 is able to generate one or more segmented surfaces from a simplified surface that is not selected as a content placement layer based the visibility statistics, where the segmented surface is associated with a visibility statistics that would result in having the segmented surface selected as a content placement layer.

In step 509, the content placement platform 103 processes one or more simplified surfaces with respect to the one or more viewpoints to determine one or more non-occluded surfaces. Determining non-occluded surfaces based on the simplified surfaces results in content placement layers that are viewable from many different angles without having to move the content placement layers, thus leading to a more intuitive augmentation. In one embodiment, where the number of viewpoints is large based on the augmentation being associated with a live image (e.g., nearly infinite viewpoints), the content placement platform 103 may determine a threshold of occlusions of the simplified surfaces and determine the one or more non-occluded surfaces based on the simplified surfaces satisfying the threshold. Accordingly, despite the large number of viewpoints and resulting possibility of finding a viewpoint that includes an occlusion of nearly every surface of a building, the content placement platform 103 will still determine one or more surfaces of a model as being non-occluded. For example, the content placement platform 103 may set the threshold such that every model is associated with at least one content placement layer. Where the number of viewpoints is smaller based on the augmentation being associated with a set number of pre-determined viewpoints, models may be associated with multiple non-occluded surfaces.

In step 511, the content placement platform 103 may determine one or more occluding objects associated with the one or more viewpoints that occluded one or more of the simplified surfaces. Then, in step 513, the content placement platform 103 causes, at least in part, a segmentation of one or more of the one or more simplified surfaces considered occluded surfaces into one or more segmented surfaces based, at least in part, on the occluding objects. The content placement platform 103 is able to generate one or more segmented surfaces from a simplified surface that is not selected as a content placement layer based the occluding object, where the segmented surface would be considered a non-occluded object because the occluding object does not occlude the specific segment of the simplified surface.

In step 515, the content placement platform 103 determines one or more content placement layers based on one or more the representational locations, the visibility statistics, the occluded surfaces, the segmented surfaces based the visibility statistics, and the segmented surfaces based on the occluding objects. After determining the content placement layers, the content placement platform 103 may transfer the information associated with the content placement layers to anyone or more of the UE 101, one or more services 109, and/or any other component associated with the system 100 for providing perspective-based content placement in augmented reality systems. By way of example, a UE 101 that is currently acquiring a live view finder image of a surrounding geographical area may receive information in the form of metadata that includes the content placement layers associated with the geographical area that are determined based on pre-processing by the content placement platform 103 with respect to the viewpoint associated with the current location of the UE 101. The UE 101 may then associate the content placement layers with the live view finder image and content items associated with the geographical area to provide additional information with respect to the geographical area while maintaining the perspective of the three-dimensional geographical area.

Figure 6B:
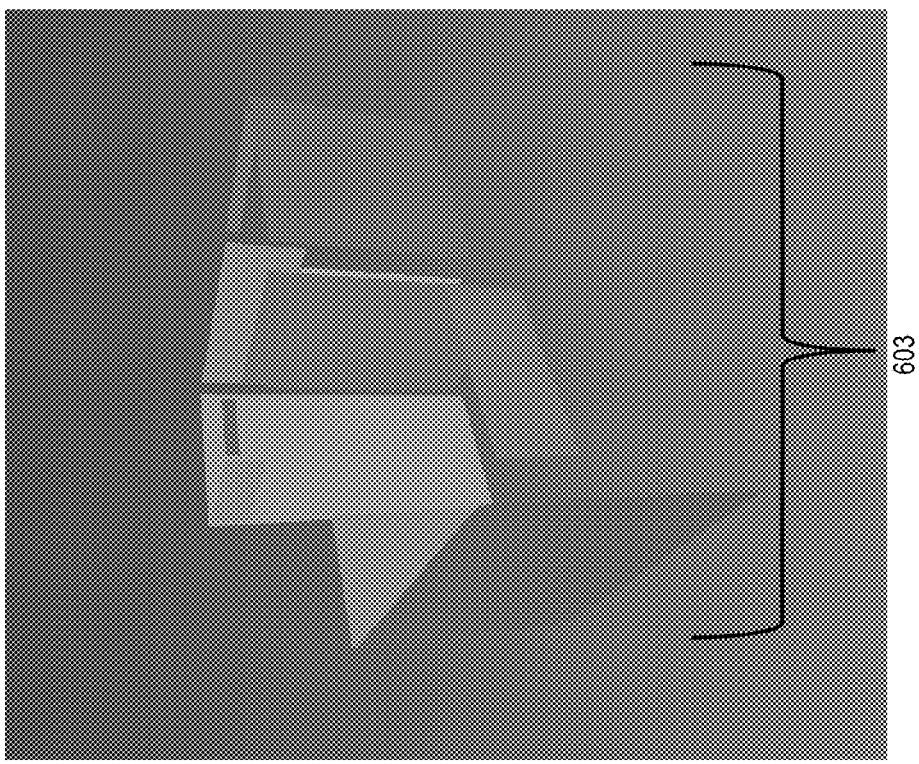
FIG. 6B is a diagram of a three-dimensional model of an object associated with a geographical area based on one or more content placement layers, according to one embodiment.
Figure 6A:
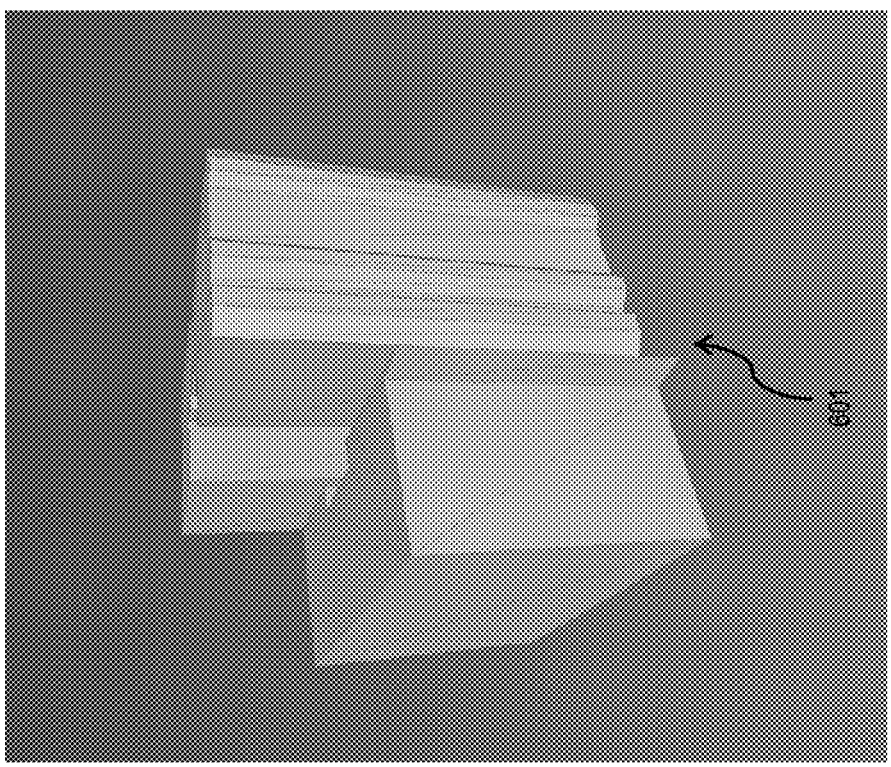
FIG. 6A is a diagram of a three-dimensional model of an object associated with a geographical area, according to one embodiment.

FIG. 6A is a diagram of a three-dimensional model 601 of an object associated with a geographical area, according to one embodiment. By way of example, the model 601 may represent a building that is part of a geographical area. A user of the UE 101 may be in the geographical area while using an augmented reality application 111a running on the UE 101 to gain more information about the area. The augmented reality application 111a may interface with one or more services 109 and/or the content placement platform 103 directly to provide the augmentation of the real world, or at least provide information concerning content placement layers for providing content items within the augmented reality that preserve the perspective of the augmentation. The model 601 may be comprised of multiple surface primitives. As illustrated in FIG. 6A, the surface primitives are in the shape of planar triangles. As illustrated, the three-dimensional model has non-regular surfaces that, for example, accurately match the shape of the building represented by the model.

FIG. 6B is a diagram of a three-dimensional model of an object associated with a geographical area based on one or more content placement layers, according to one embodiment. After the content placement platform 103 processes the model 601 illustrated in FIG. 6A according to one or more of the above described processes, the content placement platform 103 decomposes the model 601 into the one or more illustrated content placement layers 603. The content placement layers 603 are based on, for example, the simplified surfaces generated from the decomposition of the model 601 that satisfy one or more visibility statistics thresholds, constitute non-occluded surfaces, are based on one or more representational locations, and/or based on one or more segments of the simplified surfaces, as discussed above. The content placement layers 603 represent locations associated with the objects where content items may be placed to provide additional information within the augmentation while preserving the three-dimensional aspect of the augmentation in an intuitive manner.

Figure 7:
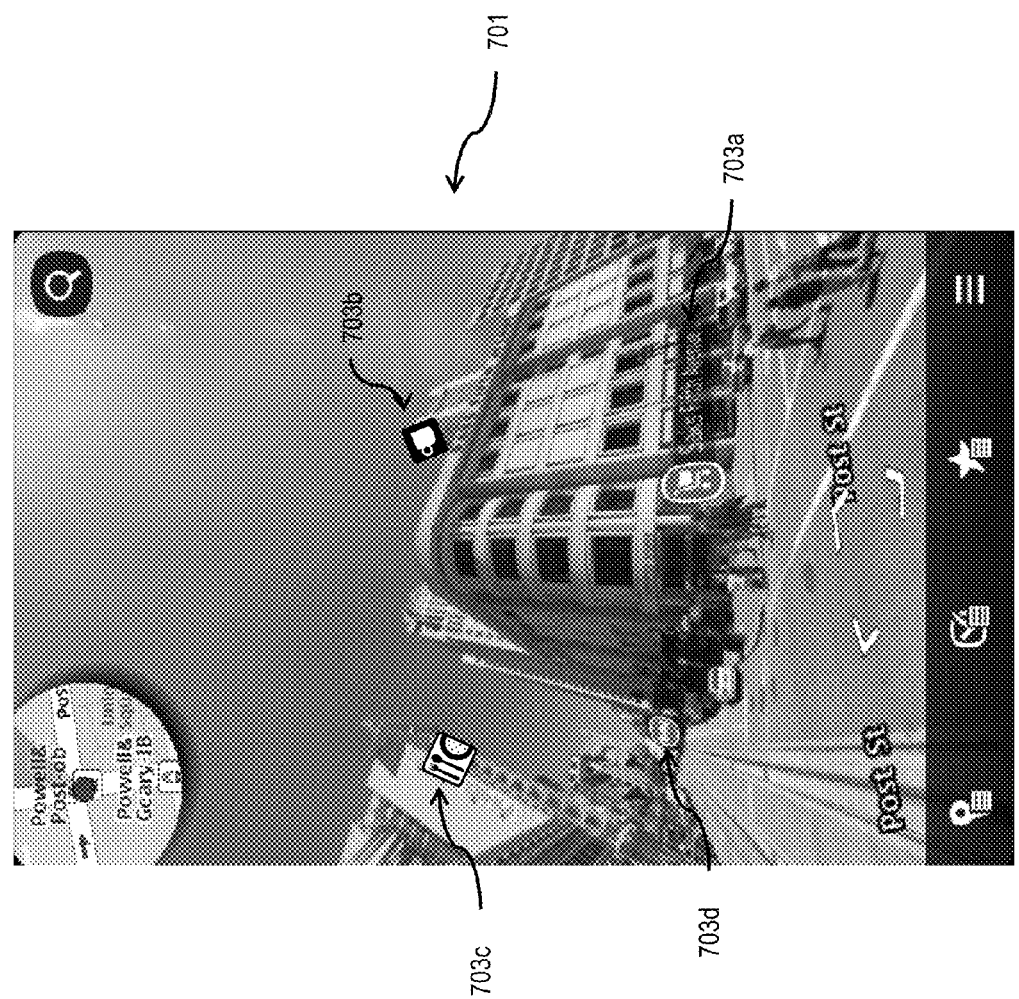
FIG. 7 is a diagram of a user interface utilized in the processes of FIGS. 3-5, according to one embodiment.

FIG. 7 is a diagram of a user interface 701 utilized in the processes of FIGS. 3-5, according to one embodiment. The user interface 701 may be associated with, for example, one or more mapping applications 111 executed at the UE 101. In one embodiment, the user interface 701 further may be associated with a live view finder image of the surrounding geographical area of the UE 101. In one embodiment, the user interface 701 may be associated with a pre-collected three-dimensional panorama of the geographical area surrounding the UE 101 represented in two dimensions on a display associated with the UE 101.

The user interface 701 includes four content items 703a-703d rendered in the augmentation according to four content placement layers (corresponding to the areas of the content items 703a-703d). As discussed above, the content placement layers were determined based, at least in part, on a viewpoint (e.g., the intersection of Powell and Post) and one or more representational locations. Focusing on the content item 703a, the content item 703a is provided in a perspective-based rendering of one or more content items associated with one or more objects included in the augmented reality (e.g., the office buildings) based on the corresponding content placement layer. For example, the perspective of the content item 703*a* matches the perspective of the building associated with the content item (e.g., Saks Fifth Avenue® building). Thus, the content item appears, for example, to be attached to the side of the building. As the perspective of the building changes in response to one or more actions to change the view of the UE 101, the perspective of the content item 703*a* will also change to maintain the appearance of the content item 703*a* being attached to the side of the building. Additionally, the content item 703*a* is associated with the first floor of the building because, for example, only the first floor of the building may be occupied by the subject of the content item (e.g., Saks Fifth Avenue®). For example, the content placement platform 103 determined that the portion of the simplified surface (that corresponds to the surface of the building) associated with the first floor is a representational location of the store Saks Fifth Avenue®. Thus, the portion of the simplified surface associated with the first floor was designated a content placement layer and associated with the item specific to Saks Fifth Avenue®.

With respect to content item 703*b*, the content item 703*b* may be associated with a coffee shop located in the building associated with the item. Because not all of the building is visible from the illustrated viewpoint, content item 703*b* is illustrated as being at the top of the building. For example, the content placement platform 103 may have determined the content placement layer associated with content item 703*b* based on a determination that at least a segment of the simplified surface generated from the decomposition of the three-dimensional model. Further, with respect to content item 703*c*, the content item 703*c* may be associated with a restaurant located in the building associated with the item. The content item 703*c* may be associated with a content placement layer as illustrated based on the high location of the content placement layer relative to the street. For example, the content placement platform 103 may have determined a simplified surface with respect to the decomposed model of the building had high visibility statistics based on the vertical height with respect to the viewpoint. Accordingly, the content placement platform 103 selected the simplified surface as a content placement layer. Further, with respect to the content item 703*d*, the content placement platform 103 also may have determined that the simplified surface associated with the content item 703*d* had high visibility statistics based on, for example, a clear line of sight existing between the viewpoint and the simplified surface. Accordingly, the content placement platform 103 selected the simplified surface as a content placement layer and associated the content item 703*d* with the layer.

The processes described herein for providing perspective-based content placement may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
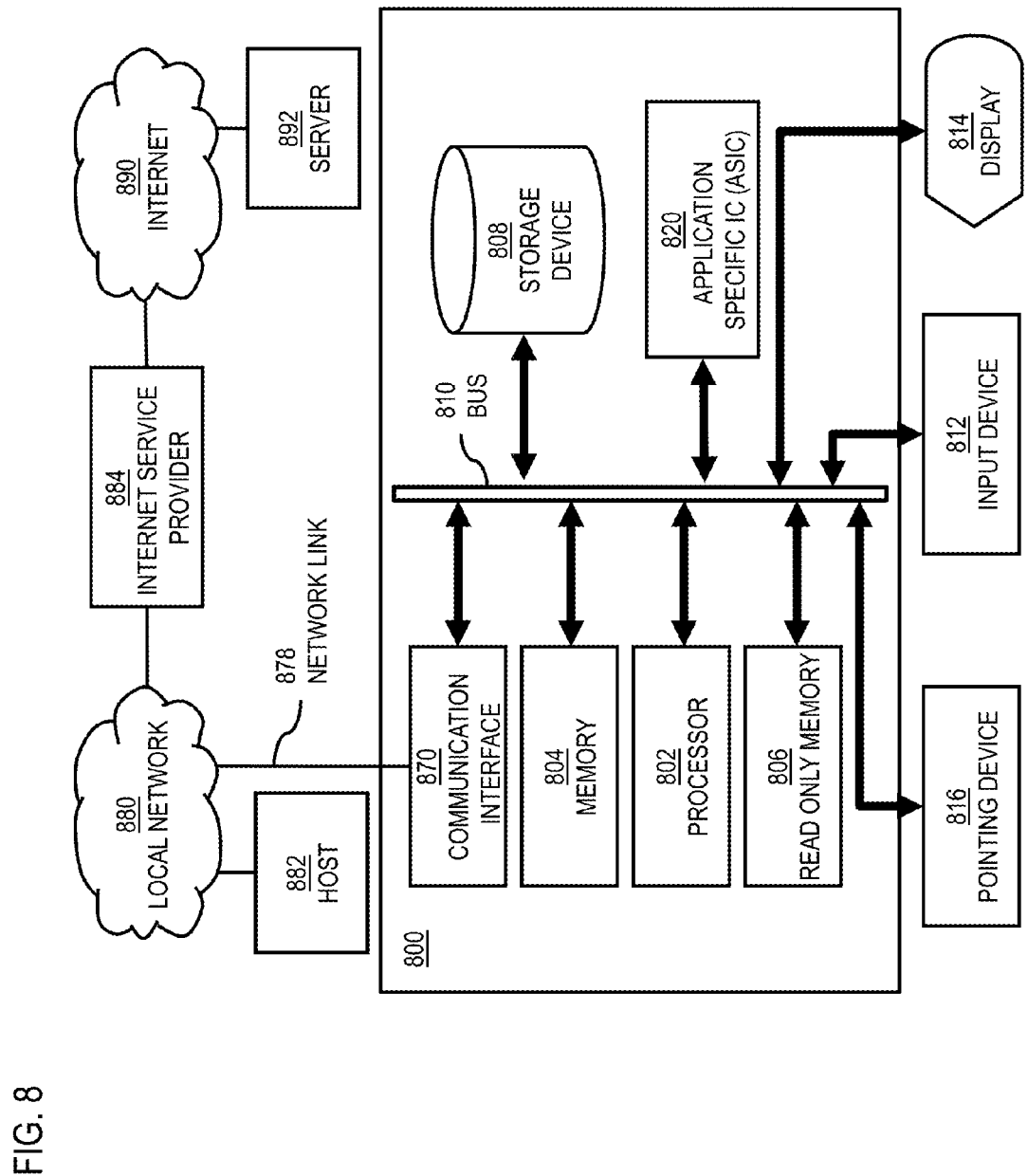
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide perspective-based content placement as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing perspective-based content placement.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing perspective-based content placement. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing perspective-based content placement. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing perspective-based content placement, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing perspective-based content placement to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide perspective-based content placement as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing perspective-based content placement.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide perspective-based content placement. The memory 905 also stores the data associated with or generated by the execution of the inventive steps.

Figure 10:
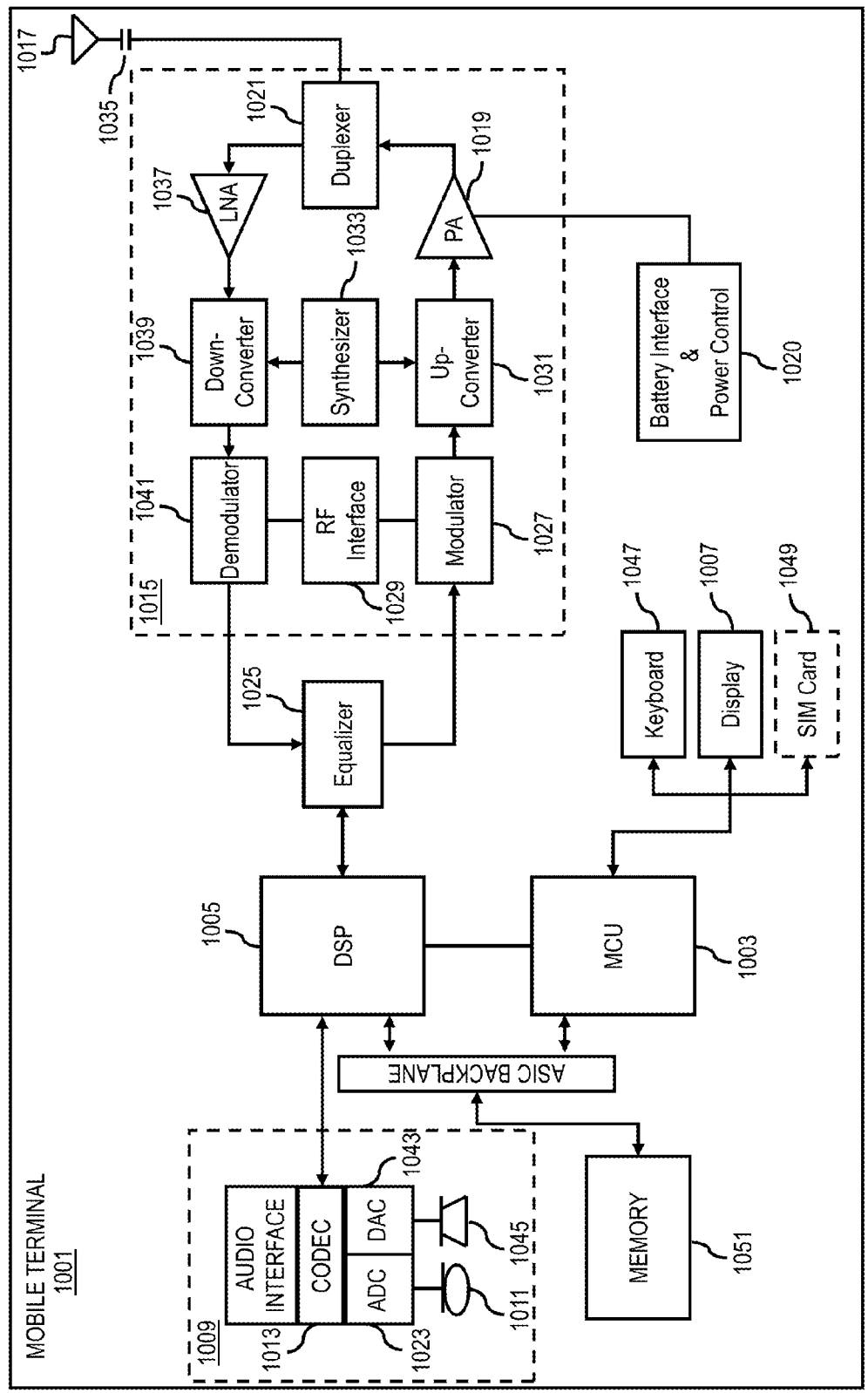
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing perspective-based content placement. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing perspective-based content placement. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide perspective-based content placement. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   a processing of one or more models of one or more objects associated with a geographical area to cause, at least in part, a decomposition of the one or more models into one or more simplified surfaces;
   a processing of the one or more simplified surfaces with respect to various viewpoints to determine visibility statistics with respect to the one or more simplified surfaces; wherein the visibility statistics rank visibility of the one or more simplified surfaces based on the various viewpoints; and
   a selection of one or more portions of the one or more simplified surfaces as one or more content placement layers based, at least in part, on the visibility statistics of the various viewpoints of the one or more simplified surfaces,
   wherein the one or more content placement layers support a perspective-based rendering of one or more content items associated with the one or more objects to display an augmented reality.

2. A method of claim 1, wherein the (1) data and/or (2) information and/or (3) at least one signal are further based, at least in part, on the following:
   at least one determination of the one or more simplified surfaces based, at least in part, on a mesh segmentation, wherein the mesh segmentation is based, at least in part, on one or more surface primitives.

3. A method of claim 2, wherein the one or more surface primitives include, at least in part, one or more planes.

4. A method of claim 2, wherein the (1) data and/or (2) information and/or (3) at least one signal are further based, at least in part, on the following:
   at least one determination of the one or more content placement layers based, at least in part, on a clustering of the one or more surface primitives, the one or more simplified surfaces, or a combination thereof.

5. A method of claim 1, wherein the (1) data and/or (2) information and/or (3) at least one signal are further based, at least in part, on the following:
   a processing the one or more models, the one or more objects, or a combination thereof to determine one or more representational locations associated with the one or more simplified surfaces; and
   at least one determination of the one or more content placement layers based, at least in part, on the one or more representational locations.

6. A method of claim 1, wherein the (1) data and/or (2) information and/or (3) at least one signal are further based, at least in part, on the following:
   a segmentation of one or more of the one or more simplified surfaces into one or more segmented surfaces based, at least in part, on the visibility statistics; and
   at least one determination of the one or more content placement layers based, at least in part, on the one or more segmented surfaces.

7. A method of claim 1, wherein the (1) data and/or (2) information and/or (3) at least one signal are further based, at least in part, on the following:
   a processing of the one or more simplified surfaces with respect to the various viewpoints to determine one or more non-occluded surfaces; and
   at least one determination of the one or more content placement layers based, at least in part, on the one or more non-occluded surfaces.

8. A method of claim 7, wherein the (1) data and/or (2) information and/or (3) at least one signal are further based, at least in part, on the following:
   one or more occluding objects associated with the various viewpoints;
   a segmentation of one or more of the one or more simplified surfaces into one or more segmented surfaces based, at least in part, on the one or more occluding objects; and
   at least one determination of the one or more content placement layers based, at least in part, on the one or more segmented surfaces.

9. A method of claim 1, wherein the one or more content items rendered within the one or more content placement layers maintain the perspectives of the one or more content placement layers.

10. An apparatus comprising:
    at least one processor; and
    at least one memory including computer program code for one or more programs the at least one memory and the computer program code configured to, with the at least one processor, cause the apparatus to perform at least the following,
    process and/or facilitate a processing of one or more models of one or more objects associated with a geographical area to cause, at least in part, a decomposition of the one or more models into one or more simplified surfaces;
    process and/or facilitate a processing of the one or more simplified surfaces with respect to various viewpoints to determine visibility statistics with respect to the one or more simplified surfaces, wherein the visibility statistics rank visibility of the one or more simplified surfaces based on the various viewpoints;
    and cause, at least in part, a selection of one or more portions of the one or more simplified surfaces as one or more content placement layers based, at least in part, on the visibility statistics of the various viewpoints of the one or more simplified surfaces,
    wherein the one or more content placement layers support a perspective-based rendering of one or more content items associated with the one or more objects to display an augmented reality.

11. An apparatus of claim 10, wherein the apparatus is further caused to:
    determine the one or more simplified surfaces based, at least in part, on a mesh segmentation, wherein the mesh segmentation is based, at least in part, on one or more surface primitives.

12. An apparatus of claim 11, wherein the one or more surface primitives include, at least in part, one or more planes.

13. An apparatus of claim 11, wherein the apparatus is further caused to:
determine the one or more content placement layers based, at least in part, on a clustering of the one or more surface primitives, the one or more simplified surfaces, or a combination thereof.

14. An apparatus of claim 10, wherein the apparatus is further caused to:
process and/or facilitate a processing the one or more models, the one or more objects, or a combination thereof to determine one or more representational locations associated with the one or more simplified surfaces; and
determine the one or more content placement layers based, at least in part, on the one or more representational locations.

15. An apparatus of claim 10, wherein the apparatus is further caused to:
cause, at least in part, a segmentation of one or more of the one or more simplified surfaces into one or more segmented surfaces based, at least in part, on the visibility statistics; and determine the one or more content placement layers based, at least in part, on the one or more segmented surfaces.

16. An apparatus of claim 10, wherein the apparatus is further caused to:
process and/or facilitate a processing of the one or more simplified surfaces with respect to the various viewpoints to determine one or more non-occluded surfaces; and determine the one or more content placement layers based, at least in part, on the one or more non-occluded surfaces.

17. An apparatus of claim 16, wherein the apparatus is further caused to:
determine one or more occluding objects associated with the various viewpoints;
cause, at least in part, a segmentation of one or more of the one or more simplified surfaces into one or more segmented surfaces based, at least in part, on the one or more occluding objects; and
determine the one or more content placement layers based, at least in part, on the one or more segmented surfaces.

18. An apparatus of claim 10, wherein the one or more content items rendered within the one or more content placement layers maintain the perspectives of the one or more content placement layers.

* * * * *